(12) United States Patent
Ru et al.

(10) Patent No.: US 12,062,003 B1
(45) Date of Patent: Aug. 13, 2024

(54) SYSTEM AND METHOD FOR FACILITATING SCENARIO IMPACT ASSESSMENT

(71) Applicant: MORGAN STANLEY SERVICES GROUP INC., New York, NY (US)

(72) Inventors: Muye Ru, New York, NY (US); Zhanike Yevniyeva, Paris (FR); Matthew Slovik, Larchmont, NY (US); Courtney Thompson, New York, NY (US); Sheng Tzou, Westport, CT (US); Shane Artis, New York, NY (US); Maria Ichizawa, New York, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/371,920

(22) Filed: Sep. 22, 2023

(51) Int. Cl.
G06Q 30/06 (2023.01)
G06Q 10/067 (2023.01)
G06Q 30/0601 (2023.01)

(52) U.S. Cl.
CPC ....... *G06Q 10/067* (2013.01); *G06Q 30/0609* (2013.01)

(58) Field of Classification Search
CPC .......................... G06Q 30/0609; G06Q 10/067
USPC .............................................. 705/26.35, 26.1
See application file for complete search history.

(56) References Cited

U.S. PATENT DOCUMENTS

2017/0132528 A1* 5/2017 Aslan ..................... G06N 20/00
2022/0101441 A1* 3/2022 Stoner, Jr. .............. G06Q 40/06

FOREIGN PATENT DOCUMENTS

AU         2021101046 A4 *  4/2021  ......... E04B 1/34321

OTHER PUBLICATIONS

Limited impact on decadal-scale climate change from increased use of natural gas Nature514.7523: 482. Macmillan Magazine Ltd. (Oct. 23, 2014) (Year: 2014).*
Identifying key sources of uncertainty in climate change projections Visser, H; Folkert, R J M; Hoekstra, J; De Wolff, J J. Climatic Change 45.3-4: 421-457. Dordrecht: Springer Nature B.V. (Jun. 2000) (Year: 2000).*

(Continued)

*Primary Examiner* — Yogesh C Garg
(74) *Attorney, Agent, or Firm* — Weitzman Law Offices, LLC

(57) ABSTRACT

A computer-implemented method and computing system for automatically chaining together a series of models and facilitating automatic execution of the series of models is disclosed. For each sequential pair of models in the series, a set of output variables from a first model from the pair and a set of input variables to a second model from the pair are identified. The method automatically identifies a set of likely matches, each likely match pairing one output variable from the first model with one input variable to the second model, based on a title for each variable or other metadata associated with each variable, and receives confirmation that each likely match represents an accurate association between the output variable and input variable. After executing the first model, a software module imports output from the first model as input to the second model, and the second model is executed.

17 Claims, 7 Drawing Sheets

(56) References Cited

OTHER PUBLICATIONS

Economic Evaluation of Large-Scale Biorefinery Deployment: A Framework Integrating Dynamic Biomass Market and Techno-Economic Models; Zetterholm, Jonas; Bryngemark, Elina; Ahlström, Johan; Söderholm, Patrik; Harvey, Simon; et al. Sustainability12. 17: 7126. MDPI AG. (2020) (Year: 2020).*

The Policy Choice and Economic Assessment of High Emissions Industries to Achieve the Carbon Peak Target under Energy Shortage—A Case Study of Guangdong Province' Ren, Songyan; Wang, Peng; Lin, Zewei; Zhao, Daiqing. Energies15.18: 6750. MDPI AG. (Year: 2022).*

\* cited by examiner

SYSTEM AND METHOD FOR FACILITATING SCENARIO IMPACT ASSESSMENT

FIELD OF INVENTION

This disclosure relates to methods and system architectures in the field of data structures used in equilibrium modeling, and more specifically, to a method for chaining together distinct models in a sequence or feedback loop to more accurately model future climate change and its consequences.

BACKGROUND

Many organizations or computing systems need to predict the outcome of a scenario based on various currently known inputs and assumptions, using a model to determine the range of outcomes or most likely outcome. In some complex scenario assessments, there may even be a desire to chain multiple models together, each model taking, as input, the output from a previous model. For example, an organization maintaining a wildlife preserve might have one model for predator and prey populations that takes as input the expected weather conditions during a period of time. A person overseeing the model might set these initial weather conditions based on assumptions that feel right to that person, but it would be preferable to instead use the output from a future climate model that operates on present variables and gives a more educated guess as to the future weather conditions incorporated by the animal population model.

However, if these models were not specifically designed for interoperability—and they rarely are—the inputs and outputs are not likely to perfectly align. A misalignment may occur in terms of the type of a value (for example, integer vs. floating point number), the significance of a value, or the label given to it in each model. Coming back to the prior example, the animal behavior model might be expecting a variable for the number of sunny days per year, whereas the climate model only outputs an expected humidity and air pressure. Even if the humidity and air pressure can be converted into an estimate of the number of sunny days, a subject matter expert would have to take the time to write a software function or macro whenever such a bridge needs to be formed between the two models.

Further, existing modeling software tends to suffer from a number of drawbacks, including lack of transparency, lack of customizability, lack of granularity in output data, lack of scalability to larger models, and slow computing time on larger models. Models tend to be treated as "black boxes" that are not designed for interoperation as a component in a larger system.

Thus, there are advantages to developing novel methods for facilitating automation when chaining models, having less reliance on human expertise or custom software development, improving the accuracy of model output, and increasing the range and scope of scenarios that can be modeled effectively.

SUMMARY OF THE INVENTION

In order to address the limitations of previous systems in this field, new methods of chaining scenario models together are disclosed.

The disclosed methods allow for improved automation of model execution, particularly for chaining together Integrated Assessment Modeling (IAM) to Computable General Equilibrium (CGE) models, with IAM output as CGE input. One possible application is to determine likely or estimated future values of attributes relevant to the environment/climate: using those values as input to macroeconomic models to identify predictable changes in human behavior and industry in response to environmental change: determine how particular organizations, or companies within industries, or asset values will be affected by those macroeconomic changes: and optionally, identify and take into account how these changes in economic performance or value will feed back into and drive further climate change or macroeconomic changes, iteratively changing the original model output.

This modeling can be routinely performed using both historical and present data to 1) help evaluate model effectiveness and understand events that previously occurred, and 2) to generate well-informed projections of future events and trends to facilitate decisions. The ability to run analyses as a batch job permits the generation of a large amount of data from different models over time, further permitting use of the generated data in other existing models and tools, to underpin other analytical capabilities. The big data nature of output may also facilitate identifying to which variables a model is most sensitive, and other investigations of a model's internal workings and accuracy, even when the source code for the model itself is unavailable.

In a preferred embodiment, a three-tiered modeling approach is employed, with IAM modeling for the climate, CGE modeling of the macroeconomic effects of climate change, including effects on particular sectors of the economy and the damage to the economy from more extreme weather events, and further microeconomic modeling of the financial downstream effects of any macroeconomic changes. This microeconomic modeling may include financial performance of particular companies, assets, or other entities of interest.

In other embodiments, modeling systems completely unrelated to economic output, or completely unrelated to climate change, may nonetheless use chaining methods described further below.

In order to provide all of the above features, a computer-implemented method and computing system for automatically chaining together a series of models and facilitating automatic execution of the series of models are disclosed. For each sequential pair of models in the series, a set of output variables from a first model from the pair and a set of input variables to a second model from the pair are identified. The method automatically identifies a set of likely matches, each likely match pairing one output variable from the first model with one input variable to the second model, based on a title for each variable or other metadata associated with each variable, and receives confirmation that each likely match represents an accurate association between the output variable and input variable. After executing the first model, a software module imports output from the first model as input to the second model, and the second model is executed.

In further variations of the above system, associated data variables may undergo a scaling, linear combination, regression, change in data type, or other data transformation upon the output variable to make it suitable for use as an input variable in the next model. Feedback loops may be incorporated into a chain of model execution to improve accuracy and account for n-th order downstream effects as intertwined domains, such as the climate and economy, continue to affect portions of each other. The output of a series of models may be used to perform automatic tasks by computing devices and/or to inform human decision makers.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION OF THE DRAWINGS

Figure 1:
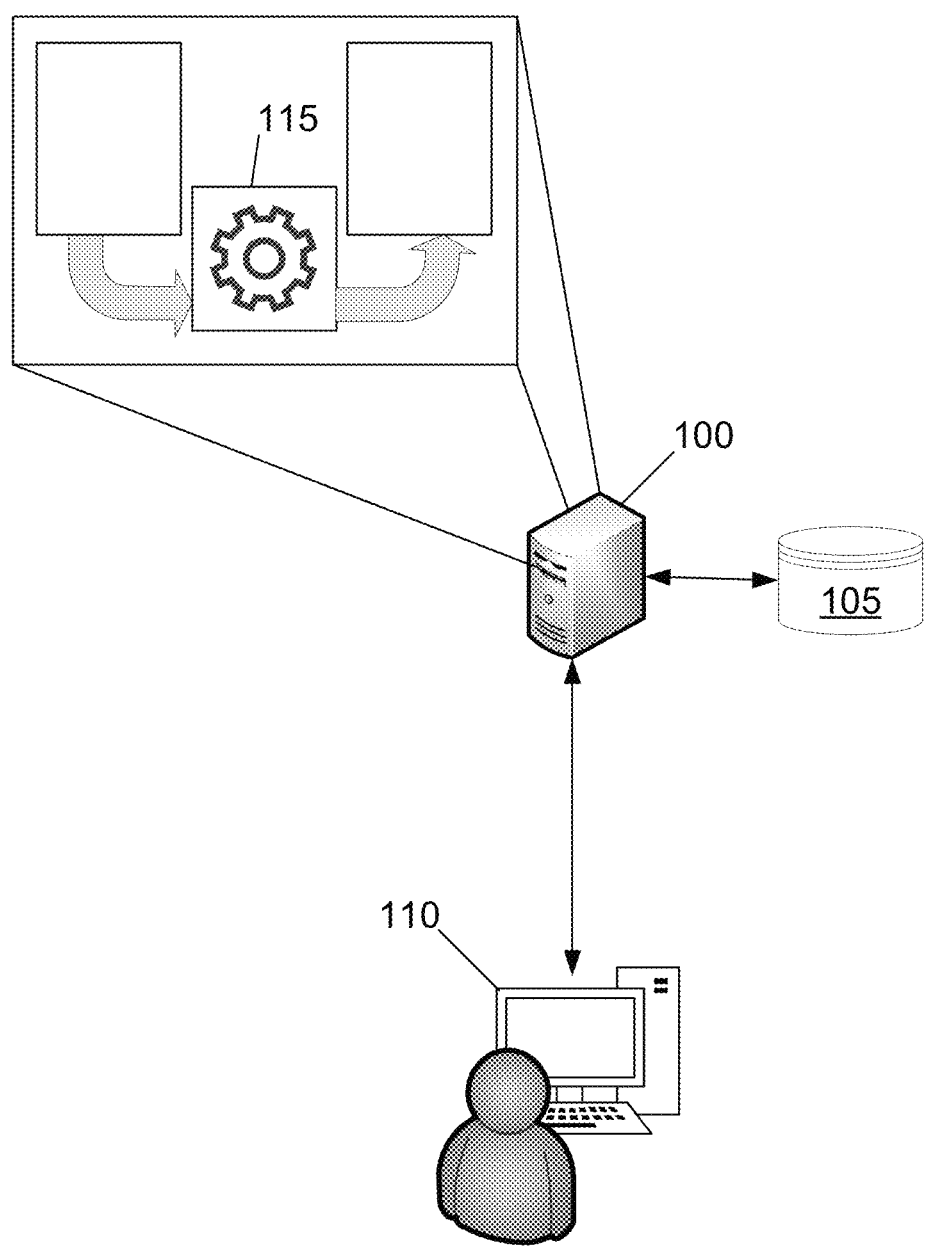
FIG. 1 depicts an example system of computing devices used to request, execute, and review the results of a group of models.

FIG. 1 depicts an example system of computing devices used to request, execute, and review the results of a group of models.

A central computing device or cluster of computing devices 100 are each communicatively attached to storage 105 that stores information concerning programmatic instructions to execute various models as well as sets of input data to those models. The input data may, in some cases, be actual historical and present data received over a network from an authoritative source, or alternatively, may be hypothetical data concerning a possible future scenario to be anticipated and better prepared for, should it ever occur.

Figure 2:
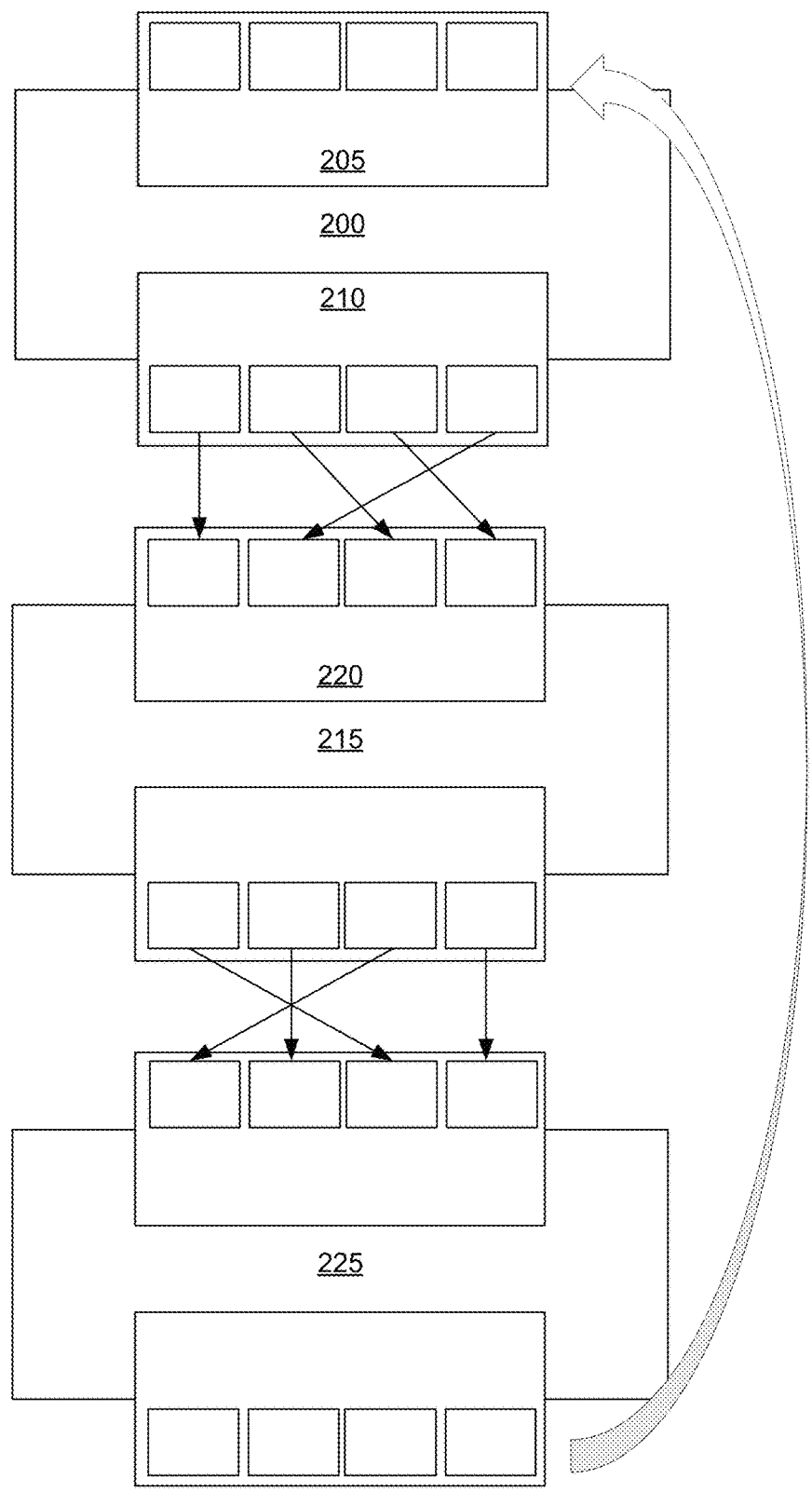
FIG. 2 depicts in a general way how a series of multiple models could be chained together, or even provide for a feedback loop.
Figure 3:
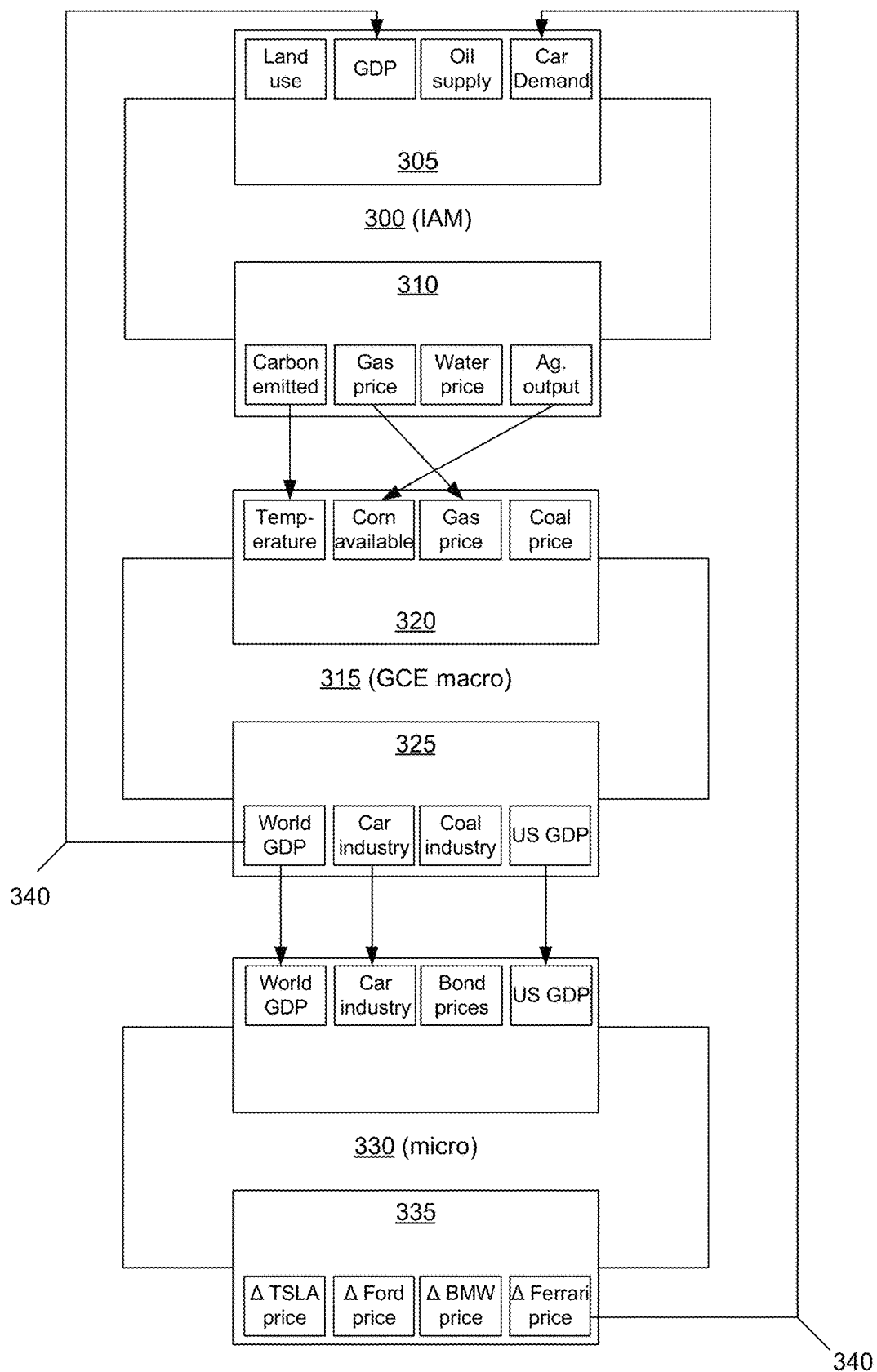
FIG. 3 depicts a more specific series of interconnected models specifically for the use case of predicting economic and climactic impact of present choices in the future.
Figure 6:
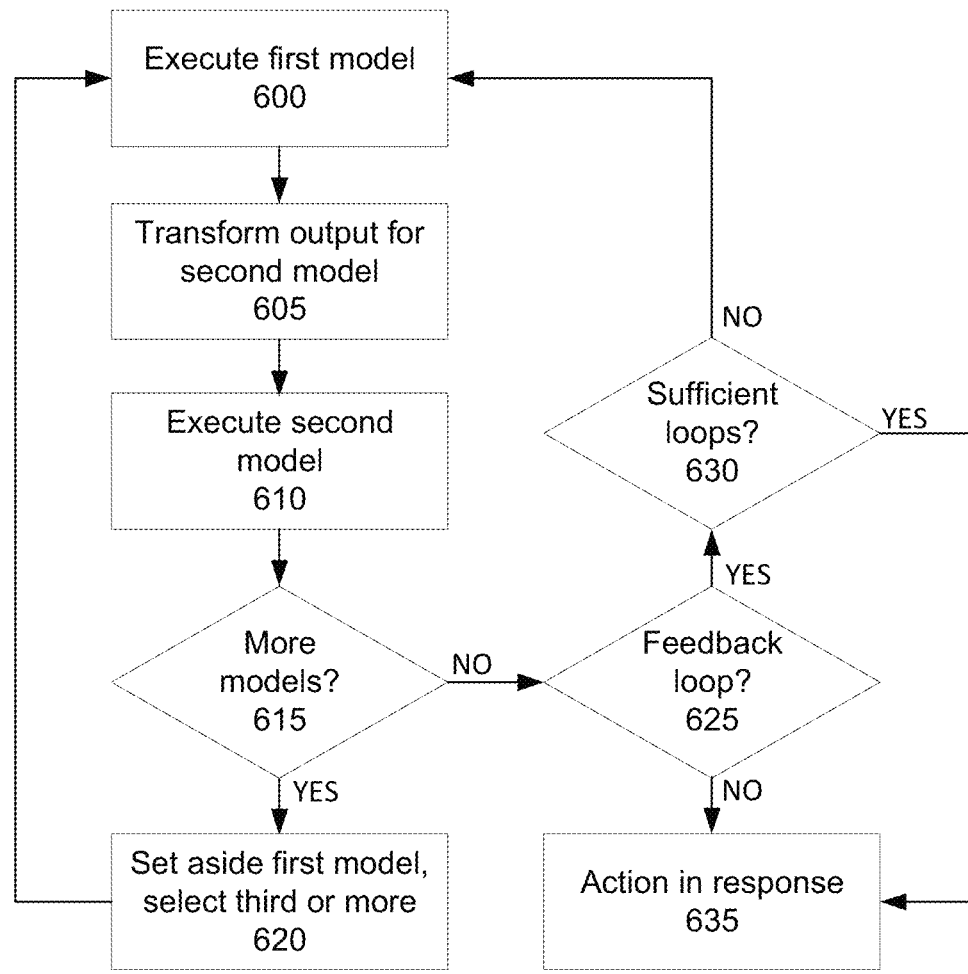
FIG. 6 depicts, in simplified flowchart form, an overarching method for executing a series of chained models and propagating their output for human consideration or automated response.

Upon request from a client computing device 110—or upon another trigger, such as a daily cron job or a batch script that is invoked under certain conditions—the central computing device or cluster of computing devices 100 will execute a particular set of models in sequence, as depicted in FIGS. 2, 3, and 6 and discussed further, below.

Figure 4:
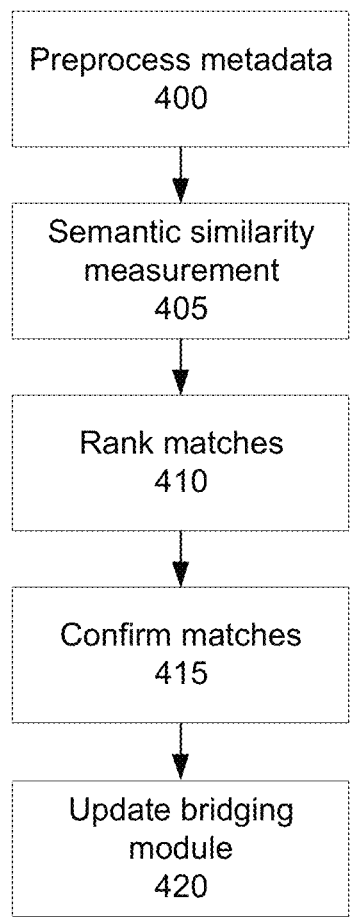
FIG. 4 depicts, in simplified flowchart form, a method of mapping inputs and outputs from chained models.
Figure 5:
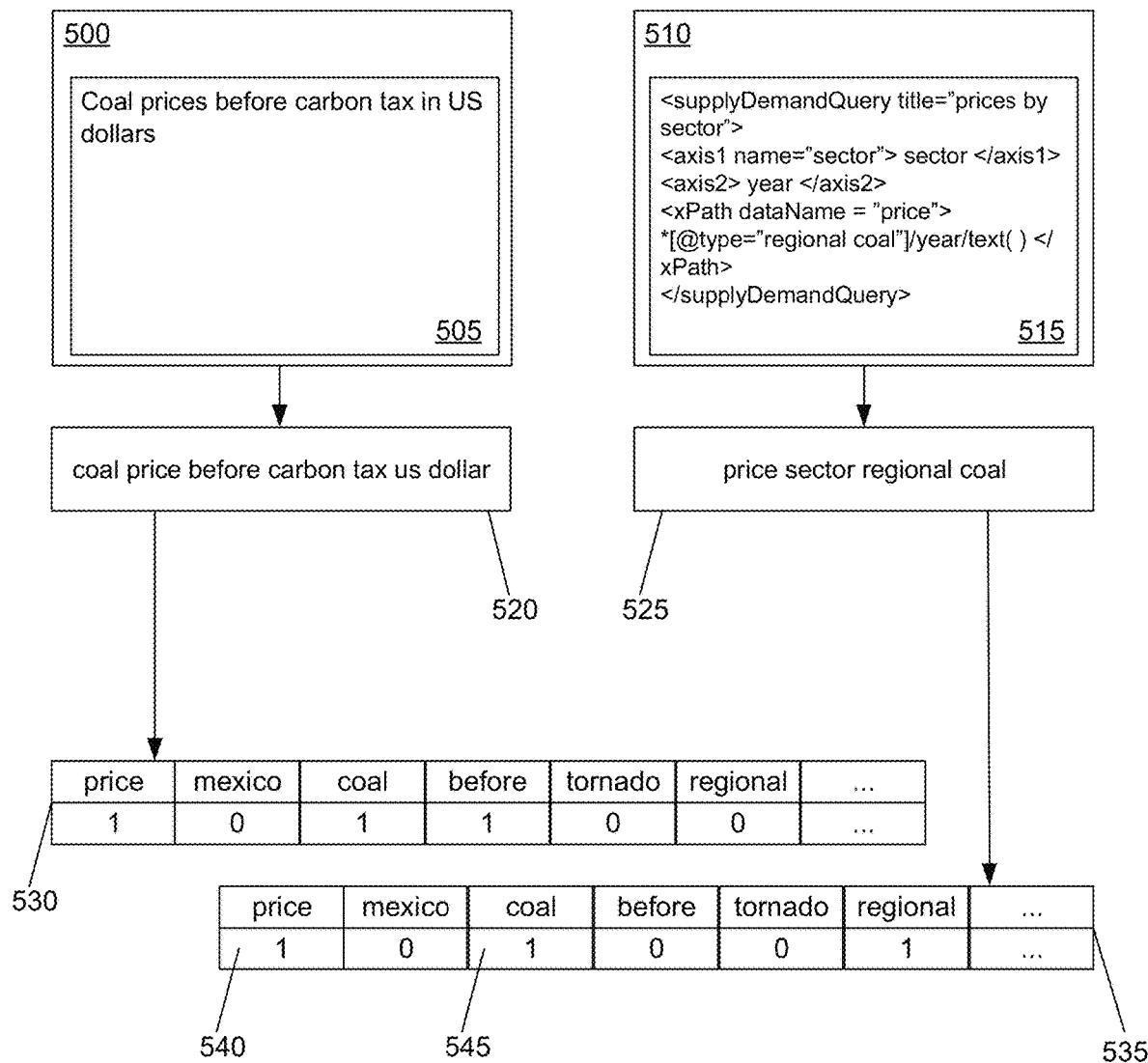
FIG. 5 depicts an example of determining a mapping according to the method depicted in FIG. 4.

In order to execute the models in sequence, the central computing device will have a bridging software module 115 that performs various functions including reading in metadata concerning the input and output of models and accepting configurations or rules in order to transform output from a first model into input for a second model. These features are depicted in FIGS. 4 and 5 discussed in greater detail below.

When execution is complete, a typical use case is that the output from said models is returned to the client computing device 110 for display and to inform potential future choices. Output from the models is also stored in the storage 105 or another data storage system to enable future access and historical analysis.

Alternatively, in some use cases, it could be that the output of the modeling will be used to trigger an automatic response without human review. For example, an automated climate control system might have its baseline temperature or sensitivity to change in temperature automatically modified in response to expected temperature changes in the near future from a weather model. An autonomous agent that monitors markets and automatically generates buy orders or sell orders for assets may change configuration parameters for when to act based on how a modeled climate change is likely to affect asset prices or asset usability.

Ultimately, many different configurations for systems may exist apart from that which is depicted in FIG. 1. For example, although a particular division of functions between devices is described here, other configurations are possible in which functions are divided among devices differently. For example, all of the functions of a central computing device 100 and client computing device 110 might conceivably be integrated into a single device with multiple threads executing different software modules simultaneously, and with storage 105 being integrated into the same device as an internal or external data drive.

As mentioned, the central computing device 100 may in fact be a cluster of computing devices sharing functionality for concurrent processing of multiple models, or for parallel processing of independent operations needed in a same model. Further, although several of these computing elements are described as if they are one computing device or cluster in a single location, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Connection of Disparate Models

FIG. 2 depicts in a general way how a series of multiple models could be chained together, or even provide for a feedback loop.

A first model 200 takes as input a number of fixed variables 205 and, based on whatever form of algorithm, transformation, neural network, etc., outputs a different series of variables 210 that predict an outcome based on the assumptions encoded by the initial variables 205. A second model 215 expects a series of variables 220 that may have some overlap or relationship with the first output variables 210, but without a perfect match of title, significance, data type, etc. If the variables 210 and 220 can be sufficiently matched and transformed into their expected significance and format, the second model 215 can be executed based on the original assumptions 205 rather than a separate set of assumptions. This process may be repeated with a third model 225, and so on.

Many models are modeling systems that are not entirely self-contained, and whose outcomes may be further modified by a reaction to a change, a reaction to the reaction, and so. Accuracy may be further improved if there is a feedback loop established, such that after the execution of a later model 225, output variables are used to modify or replace the original assumptions 205.

Pivoting from General Model Chaining to Specific Applications

Climate change has already had and will likely continue to have a nearly indescribable magnitude of effect on economic relationships and transactions. Therefore, any model used to predict future economic outcomes and to adjust present economic choices accordingly should incorporate predictions regarding environmental changes, not only the direct actions of human economic actors and their choices.

More accurate modeling of the economic effects of climate change has many tangible benefits. An organization will be able to "stress test" their strategy under typical- and worst-case assumptions to see whether the organization will still be able to carry out its mission. An organization that seeks to maximize investment value will have better information regarding whether an investment that is more sensitive to climate-based risk is likely to be profitable. An organization that has made a promise to be carbon-neutral will be better able to predict whether, for example, a given ratio of investment in fossil fuels and green energy is likely to result in an outcome consistent with that promise. An organization may also be able to reduce risk by predicting future climate stressors and modifying organizational strategy accordingly to avoid or mitigate the risk.

To that end, FIG. 3 depicts a more specific series of interconnected models specifically for the use case of predicting economic and climactic impact of present choices in the future.

In this specific embodiment, the first model 300 is an IAM that takes as input a number of variables 305 including land use, world population, world economic output as GDP, supplies of various resources, and demand for various resources or goods. The outputs 310 of the IAM may include expected actual carbon emissions, water use, water prices, energy use, energy prices, agricultural output, and so on for various regions or worldwide.

The second model 315 is a GCE model for macroeconomic behavior that may predict regional, national, or local changes in sectors of the economy based on variables 320 that are directly predicted by or related to the output of the first model 300. For example, if gasoline prices were to drastically increase according to the IAM model, there would be predictable changes in automobile use, shipping costs, energy markets, and so on. These specific predictions can be output as variables 325.

In the final chaining step, the effects 335 on particular firms or assets may be predicted based on a microeconomic model 330 that relies on the macroeconomic predictions. For example, if an increase in gasoline prices leads to a predicted contraction of the automobile industry by 10%, a model might determine that an exclusively electric car manufacturer is predicted to decrease in revenues by only 2%, while a primarily gas-powered car manufacturer is predicted to decrease in revenues by 13%. Changes in the stock market, bond prices, and other asset prices might be better predicted as a result.

The feedback step may involve any number of these macroeconomic outcome variables 325 or microeconomic outcome variables 335 being fed back into the climate model directly or indirectly. For example, if electric car manufacturers become more dominant in the marketplace, the overall carbon emissions and demand for oil-based products will decrease accordingly and mitigate the climate model's original output, shifting the overall chain of outputs closer to an equilibrium than to an extreme outcome that does not account for reactions by humans to the climate change or reactions of the climate to human choices. For another example, the expected changes to GDP from climate change to the macroeconomy may be fed back into the IAM model. These feedback steps 340 help to improve the accuracy of the modeling and identify a possible future equilibrium.

Using these final outputs, it is possible to assess the "climate penalty" to economic growth generally or to particular industries or organizations. Further, much more granular data is captured on a firm by firm or asset by asset basis to inform investment choices and ensure a retention of portfolio value even in the face of daunting climate-related challenges.

Identifying Links to Facilitate Chaining

As previously mentioned, the thousands or millions of outputs from IAM or other modelling are likely to be completely infeasible for matching to expected inputs of a CGE model or other modelling not specifically designed for interoperability.

FIG. 4 depicts, in simplified flowchart form, a method of automatically assisting in mapping inputs and outputs from chained models.

Rather than have a human engineer review lists of output variables from the first model and input variables to the second model, identifying close matches in variable names may be performed by a computing device and the closest matches provided to a human for verification. A first-pass review by an automated process is critical when the chained models can have on the order of thousands or even millions of variables.

First, all of the metadata associated with input and output variables undergoes preprocessing (Step 400). The metadata may come from a model's documentation and specify, in a phrase, sentence, or paragraph, the significance or meaning of a variable. The preprocessing may include, depending on the models involved, tokenizing, lemmatizing, changing all characters to lowercase, removing particular characters (especially punctuation, symbols, or whitespace), removing numbers, and/or removing stop words. These tasks may be performed via regular expression or other string manipulation functions.

After the metadata associated with each variable is all in a common format, semantic similarity measurement is performed on each pair of variables' metadata (Step 405) to determine relative likelihood that the variables are identical or related. The likelihood may be based on vectorizing each sentence as a "bag of words" model and determining the cosine-similarity or other vector similarity technique: it may be based on distance-based metrics, Pearson or Spearman correlations, or kernel metrics; or it may be based on the use of existing sentence evaluation models such as Universal Sentence Encoder (USE), Sentence-BERT (SBERT), or InferSent.

After ranking these potential matches by apparent similarity (Step 410), the matchings are preferably provided to a human user for verification (Step 415), with matchings being removed from consideration as possible matches if one of the variables involved has already been paired off.

Once as many matches as possible have been determined, configuration data is sent to the bridging software module (Step 420) to enable the output from the first model to be fed to the second model without human involvement.

FIG. 5 depicts an example of determining a mapping according to the method depicted in FIG. 4.

One climate related model may comprise a variable 500 whose explanation 505 is "Coal prices before carbon tax in US dollars" while a variable 510 in another model is populated by an XPATH query structure 515 of something like "<supplyDemandQuery title="prices by sector"> <axis1 name="sector"> sector </axis1> <axis2> year </axis2> <xPath dataName="price">*[(@type="regional coal"]/year/text( )</xPath> </supplyDemandQuery>"

Preprocessing techniques might be selected to remove the "in" and to stem the nouns in the first model, while removing most of the XPath syntax in the second model.

As a result, after preprocessing, the resulting formatted texts 520, 525 might be "coal price before carbon tax us dollar" and "price sector regional coal".

After vectorizing, each vector 530, 535 will have a 1 in the fields 540, 545 that represent "coal" and "price", and the two vectors will be mostly zeroes with a few other instances of mismatch on fields such as "before" or "regional".

When all possible pairs of vectors are considered, the matches on coal and price should outweigh any other matches and lead to a facilitated identification of a match.

A Configurable Rules Engine

The bridging software module, in addition to identifying potential links between input and output variables, may also perform data transformations rather than simply forwarding a value from one variable to an appropriate other variable.

In one example, there may be scaling of a variable. For example, if one model were to output automobile manufacturing for a given year, while another model were to expect new automobile purchases for a given year, historical statistics may indicate that 95% of all newly manufactured cars are sold, and thus that the variable should be multiplied by 0.95. A scaling parameter may be stored for each variable association and modified as often as necessary. Other numerical relationships, such as an arbitrary polynomial, logarithm, exponential, etc. function may be stored in a rules engine for deriving or estimating one variable value based on another.

In another example, there may be a transformation of data type. Such a transformation may be from one number to another number scale (such as converting between Celsius, Kelvins, and Fahrenheit degrees) or from a non-numeric to numeric value or vice versa (such as converting a bond rating of "A" to an interest rate of 4%, or converting a Boolean value such as "is_open_on_weekends" into a numeric value implied by the Boolean, such as "5" for "num_days_of_week_open").

In another example, there may be a linear combination of multiple variables. For example, if one model were to output GDP of England, Scotland, Wales, and Northern Ireland separately, while another model were to expect as input the GDP of the U.K., a rule could be stored to always use the sum of the first four outputs as the input in the next model. In other cases, multiplications or subtractions or other relationships could be stored—for example, transforming an output gross income and expenses into an input net income via subtraction of the two variables.

In another example, there may be linear regression or other statistical techniques automatically performed to identify and, in an estimated way, quantify a relationship between two variables based on historical data. Particular relationships identified may be encoded as rules for transformation.

In another example, there may be means of updating rules based on machine learning techniques. Particular relationships may be encoded as rules for transformation based on the use of neural networks, adaptive models, or other techniques for guessing how a particular variable will affect another based on historical data, even when no relationship is fixed or immediately apparent.

Whether the rules engine simply copies a value from one model to another or applies a more complex transformation to the value before doing so, the rules engine will vastly improve the adaptability and reliability of a model-chaining system. The rules engine allows customization and configuration at any time, and takes away the "black box" aspect so common in many uses of artificial intelligence techniques utilized today.

Connecting Everything Together

FIG. 6 depicts, in simplified flowchart form, an overarching method for executing a series of chained models and propagating their output for human consideration or automated response.

First, a first model is executed with various input assumptions (Step 600).

Using the bridging software module, at least some of the outputs from the first model are transformed to be suitable for the second model (Step 605), as previously described.

Incorporating these transformed outputs, the second model is executed (Step 610).

If there are more than two models (Step 615), the previous of the two is now set aside, and the latter of the two now becomes the previous, with the next model taking its place (Step 620), and repeating the process (back to Step 600), with the output from the previous model becoming the assumed input to the latter model.

When all of the models have been executed in sequence, there may optionally be a feedback loop (Step 625). The bridging software module may contain instructions to transform outputs from a second, third, or other model back into inputs to the first, second, or other model that replace the initial assumptions on the first pass through the chain of models, as depicted in FIG. 2. For example, if a macroeconomic model shows a predicted upward pressure on gasoline prices, or if a microeconomic model shows a predicted increase in market share for an electric car manufacturer, the climate model's input may be updated to show that carbon dioxide outputs may in fact be lower than with the initial assumptions that did not take into account feedback loops.

If the feedback loop has been performed a sufficient number of times, the modeling process ends (Step 630). In various use cases, there may be only a single repetition of the loop: or a fixed number of iterations found experimentally to be a good balance between accuracy and computational time and complexity (for example, three times, or five times); or loops may iterate until the models all reach a relatively stable point (for example, when an iteration returns outputs that differ from the previous outputs by no more than 1%), stopping only if a maximum count trigger has been reached (to prevent an infinite loop, if the models are too chaotic to reach a stable state).

Finally, after all computations have been completed, an action step is performed (Step 635). This step may, in some use cases, be purely informative: a report may be generated, a user interface may display the results, an electronic communication may be generated and sent by e-mail or text message, or a log may be generated and automatically transmitted to a database or data lake for storage and later retrieval to view how past predictions have trended. If the action is informative, a human assessor may change an organization's strategy or use particular means available to help secure, avoid, benefit from, or mitigate harm from a predicted outcome. Information may also be used to ensure compliance with climate-neutral or carbon-neutral pledges, to comply with regulations, to provide auditing proof demonstrating methods of reducing risk, to tailor investment portfolios for a desired outcome, to improve diversification.

In other cases, an automatic task may be performed based on the outcome of the model. For example, a system that automatically purchases or sells assets may change its configuration or behavior based on predicted future changes, automatically favoring selling an asset whose value is predicted to decrease or buying an asset whose value is predicted to increase. Intermediary devices between such a system and a marketplace may be configured to review requests routed through them and refuse to forward requests to the marketplace if the predicted impact of the request upon fulfillment is negative.

Computing Devices Generally

FIG. 1 depicts a preferred configuration of computing devices and software modules to accomplish the software-implemented methods described above, and those methods do not inherently rely on the use of any particular specialized computing devices, as opposed to standard desktop computers and/or web servers. For the purpose of illustrating possible such computing devices, FIG. 7, below, describes various enabling devices and technologies related to the physical components and architectures described above.

Figure 7:
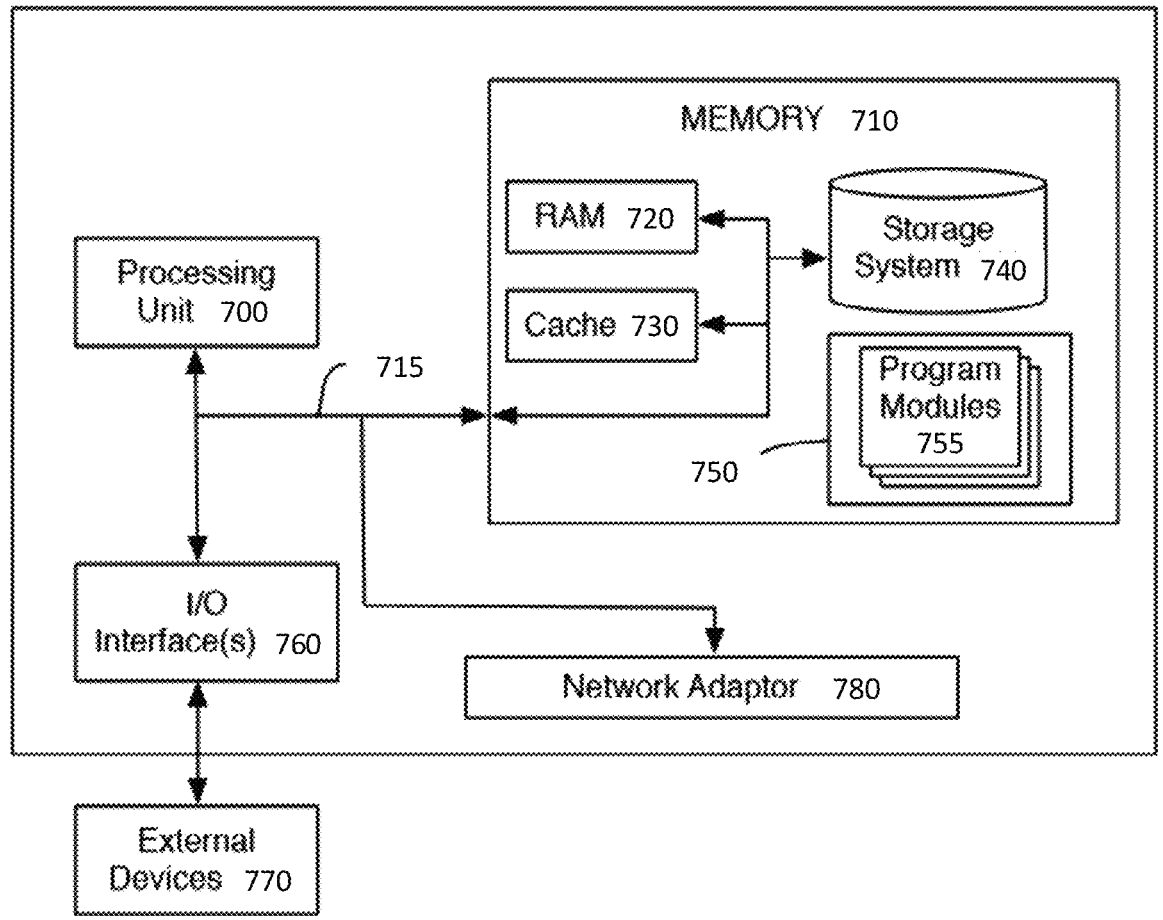
FIG. 7 is a high-level block diagram of a representative computing device that may be utilized to implement various features and processes described herein.

FIG. 7 is a high-level block diagram of a representative computing device that may be utilized to implement various features and processes described herein, for example, the functionality of the central computing device 100, storage 105, and client computing device 110, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computing device is illustrated in the form of a special purpose computer system. The components of the computing device may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 700 may be used.

The computing device typically includes a variety of computer system readable media. Such media may be any available media that is accessible by the computing device, and it includes both volatile and non-volatile media, removable and non-removable media.

System memory 710 can include computer system readable media in the form of volatile memory, such as random access memory (RAM) 720 and/or cache memory 730. The computing device may further include other removable/non-removable, volatile/non-volatile computer system storage media. By way of example only, storage system 740 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 770 such as a keyboard, a pointing device, a display, etc.: one or more devices that enable a user to interact with the computing device; and/or any devices (e.g., network card, modem, etc.) that enable the computing device to communicate with one or more other computing devices. Such communication can occur via Input/Output (I/O) interface(s) 760.

In addition, as described above, the computing device can communicate with one or more networks, such as a local area network (LAN), a general wide area network (WAN) and/or a public network (e.g., the Internet) via network adaptor 780. As depicted, network adaptor 780 communicates with other components of the computing device via bus 715. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for automatically chaining together a series of three or more models and facilitating automatic execution of the series of models, comprising:
a server that executes software to retrieve data values from memory and execute models depending on those data values, and
memory storing instructions that, when executed by a processor of the server or of another computing device in communication with the server, cause the processor to:
for each sequential pair of models in the series:
identify a set of output variables from a first model from the pair and identifying a set of input variables to a second model from the pair;
automatically identify a set of likely matches, each likely match pairing one output variable from the first model with one input variable to the second model, based at least in part on natural language processing for semantic similarity between titles for the input variable and the output variable or between other metadata associated with the input variable and the output variable;
receive confirmation that each likely match represents an accurate association between the output variable and input variable;

execute the first model;
operate a software module to import output from the first model as input to the second model including adapting data such that compatibility is maintained when one model of the pair uses XPath query syntax and the other model of the pair does not; and
execute the second model;
wherein the output from a last model in the series feeds back as input to the first model or another model, creating a feedback loop and
based on output from a last model of the series, automatically select a reaction to implement by means of a computing device.

2. The system of claim 1, wherein the first model is used to project climate outcomes over a future time period, and wherein the second model or a subsequent model in the series of models is used to project macroeconomic outcomes over the future time period, based at least in part on the projected climate outcomes.

3. The system of claim 1, wherein the automatically identifying a set of likely matches comprises vectorizing metadata associated with the variables and performing a semantic similarity analysis.

4. The system of claim 1, wherein the software module comprises a rules engine and performs a transformation of data of one or more of the output variables of the first model before being used as input variables to the second model.

5. The system of claim 4, wherein the transformation is a linear combination of multiple output variables to obtain a single input variable.

6. The system of claim 4, wherein the transformation is a scaling of an output variable before use as an input variable.

7. The system of claim 4, wherein the transformation is a statistically-informed linear regression of one or more output variables to obtain a single input variable.

8. The system of claim 1, wherein the feedback loop is repeated via iterated executions of the three or more models in sequence to converge towards an equilibrium.

9. A system for automatically chaining together a series of models and facilitating automatic execution of the series of models, comprising:
a server that executes software to retrieve data values from memory and execute models depending on those data values, and
memory storing instructions that, when executed by a processor of the server or of another computing device in communication with the server, cause the processor to:
for each sequential pair of models in the series, identify a set of output variables from a first model from the pair and identifying a set of input variables to a second model from the pair;
automatically identify a set of likely matches, each likely match pairing one output variable from the first model with one input variable to the second model, based on a title for each variable or other metadata associated with each variable;
receive confirmation that each likely match represents an accurate association between the output variable and input variable;
execute the first model;
operate a software module to import output from the first model as input to the second model;
execute the second model; and
based on output from the second model, automatically select a reaction to implement by means of a computing device, wherein the automatically selected reaction to implement by means of a computing device is an automatic prevention of communication between a second computing device attempting to submit a buy or sell order and a marketplace to which the second computing device is attempting to submit the buy or sell order.

10. A computer-implemented method for automatically chaining together a series of three or more models and facilitating automatic execution of the series of models, comprising:
for each sequential pair of models in the series:
identifying a set of output variables from a first model from the pair and identifying a set of input variables to a second model from the pair;
automatically identifying a set of likely matches, each likely match pairing one output variable from the first model with one input variable to the second model, based at least in part on natural language processing for semantic similarity between a titles for each the input variable and the output variable or between other metadata associated with each the input variable and the output variable;
receiving confirmation that each likely match represents an accurate association between the output variable and input variable;
executing the first model;
operating a software module to import output from the first model as input to the second model including adapting data such that compatibility is maintained when one model of the pair uses XPath query syntax and the other model of the pair does not; and
executing the second model;
wherein the output from a last model in the series feeds back as input to the first model or another model, creating a feedback loop and
based on output from a last model of the series, automatically selecting a reaction to implement by means of a computing device.

11. The method of claim 10, wherein the automatically selected reaction to implement by means of a computing device is an automatic prevention of communication between a second computing device attempting to submit a buy or sell order and a marketplace to which the second computing device is attempting to submit the buy or sell order.

12. The method of claim 10, wherein the automatically identifying a set of likely matches comprises vectorizing metadata associated with the variables and performing a semantic similarity analysis.

13. The method of claim 10, wherein the software module comprises a rules engine and performs a transformation of data of one or more of the output variables of the first model before being used as input variables to the second model.

14. The method of claim 13, wherein the transformation is a linear combination of multiple output variables to obtain a single input variable.

15. The method of claim 13, wherein the transformation is a scaling of an output variable before use as an input variable.

16. The method of claim 13, wherein the transformation is a statistically-informed linear regression of one or more output variables to obtain a single input variable.

17. The method of claim 10, wherein the feedback loop is repeated via iterated executions of the three or more models in sequence to converge towards an equilibrium.

* * * * *